United States Patent
Jeon

(10) Patent No.: US 9,001,010 B2
(45) Date of Patent: Apr. 7, 2015

(54) FLEXIBLE DISPLAY DEVICE AND METHOD OF COMPENSATING FOR LUMINANCE OF THE FLEXIBLE DISPLAY DEVICE

(71) Applicant: Samsung Display Co., Ltd., Yongin, Gyeonggi-Do (KR)

(72) Inventor: Mu-Kyung Jeon, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 196 days.

(21) Appl. No.: 13/827,442

(22) Filed: Mar. 14, 2013

(65) Prior Publication Data

US 2014/0118319 A1    May 1, 2014

(30) Foreign Application Priority Data

Oct. 29, 2012 (KR) .................. 10-2012-0120617

(51) Int. Cl.
    *G09G 3/30*      (2006.01)
    *G09G 3/36*      (2006.01)
    *G06F 1/00*      (2006.01)
    *G09G 3/32*      (2006.01)

(52) U.S. Cl.
    CPC ............... *G06F 1/00* (2013.01); *G09G 3/3208* (2013.01); *G09G 2380/02* (2013.01)

(58) Field of Classification Search
    CPC .................... G09G 2380/02; G06F 1/1652
    USPC .................................................. 345/76, 108
    See application file for complete search history.

(56) References Cited

U.S. PATENT DOCUMENTS

| 7,113,661 | B2* | 9/2006 | Arai et al. ...................... 385/14 |
| 7,368,307 | B2* | 5/2008 | Cok ............................... 438/26 |
| 8,462,289 | B2* | 6/2013 | Nishizawa et al. ............. 349/58 |
| 2003/0134488 | A1* | 7/2003 | Yamazaki et al. ............ 438/455 |
| 2004/0135160 | A1* | 7/2004 | Cok ................................ 257/88 |
| 2006/0109391 | A1* | 5/2006 | Huitema et al. ................ 349/19 |
| 2008/0062164 | A1* | 3/2008 | Bassi et al. .................... 345/214 |
| 2008/0068320 | A1 | 3/2008 | Kim et al. |
| 2009/0059563 | A1* | 3/2009 | Takata et al. ................. 362/97.1 |
| 2009/0149224 | A1* | 6/2009 | Yamazaki et al. ............. 455/566 |
| 2010/0118003 | A1 | 5/2010 | Yamashita et al. |
| 2011/0026233 | A1 | 2/2011 | Hong et al. |

(Continued)

FOREIGN PATENT DOCUMENTS

| JP | 2010-113229 A | 5/2010 |
| KR | 10-2008-0025931 A | 3/2008 |

(Continued)

*Primary Examiner* — Kevin M Nguyen
*Assistant Examiner* — Cory Almeida
(74) *Attorney, Agent, or Firm* — Robert E. Bushnell, Esq.

(57) ABSTRACT

A flexible display device and a method of compensating for luminance of the flexible display device, the flexible display device including: a flexible display panel including a first display region and second display regions at opposite sides of the first display region and having a shape of a curved surface that is bent from a central axis of the flexible display panel at a angle; optical sensors disposed in each of the first display region and the second display regions and measuring amounts of light in the first display region and the second display regions; and a luminance compensation unit compensating luminance of the first display region and luminance of the second display regions based on the measured amounts of light.

20 Claims, 7 Drawing Sheets

(56) References Cited

U.S. PATENT DOCUMENTS

2012/0235893 A1* 9/2012 Phillips et al. ................ 345/156
2012/0256720 A1* 10/2012 Byun et al. ........................ 338/2
2014/0002419 A1* 1/2014 Thorson et al. ............... 345/175

FOREIGN PATENT DOCUMENTS

| KR | 10-2008-0046443 A | 5/2008 |
| KR | 1020110012280 | 2/2011 |
| KR | 10-2012-0092313 A | 8/2012 |

* cited by examiner (b)

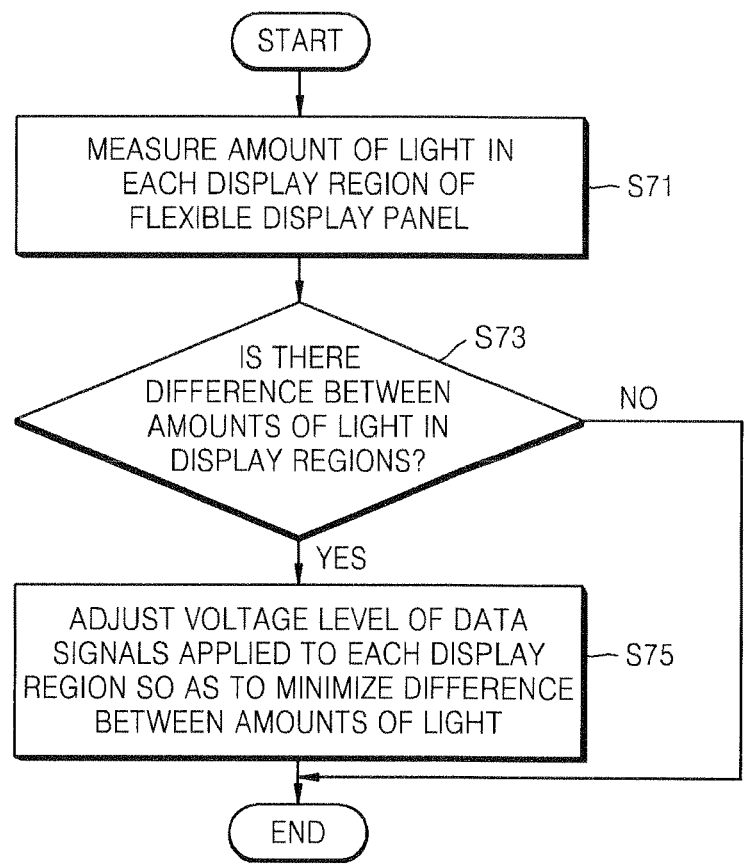

FLEXIBLE DISPLAY DEVICE AND METHOD OF COMPENSATING FOR LUMINANCE OF THE FLEXIBLE DISPLAY DEVICE

CLAIM OF PRIORITY

This application makes reference to, incorporates the same herein, and claims all benefits accruing under 35 U.S.C. §119 from and application earlier filed in the Korean Intellectual Property Office on 29 Oct. 2012 and there duly assigned Serial No. 10-2012-0120617.

BACKGROUND OF THE INVENTION

1. Field of the Invention

The present invention relates to a display device including a flexible display panel and a method of compensating for luminance of the display device.

2. Description of the Related Art

Flexible display devices have been recently spotlighted as a new technique in the field of display. Such flexible display devices are implemented on a plastic substrate that is thin and flexible and thus are not damaged even when they are folded or rolled like a paper. Flexible display devices are implemented by using liquid crystal display (LCD) devices or organic light emitting diode (OLED) devices, each including thin film transistors (TFTs).

SUMMARY OF THE INVENTION

The present invention provides a flexible display device that may eliminate non-uniformity of picture quality characteristics due to a bent flexible display panel.

According to an aspect of the present invention, there is provided a flexible display device including a flexible display panel including a first display region and second display regions in both sides of the first display region and having a shape of a curved surface that is bent from a center of the flexible display panel at an angle; an optical sensor disposed in each of the first display region and the second display regions and measuring amounts of light in the first display region and the second display regions; and a luminance compensation unit compensating luminance of the first display region and luminance of the second display regions based on the measured amounts of light.

The optical sensor measures external illuminance and the amount of light emitted from a pixel disposed in the first display region or the second display regions.

The luminance compensation unit compensates for luminance of the first display region and luminance of the second display region based on a difference between the measured amounts of light in the first display region and the second display regions that occurs due to a bent angle of the flexible display panel.

The flexible display device further includes a lookup table in which a relationship between the measured amounts of light of the optical sensor and luminance is defined, wherein the luminance compensation unit determines luminance corresponding to the difference between the measured amounts of light by using the lookup table and adjusts luminance of at least one of the first display region and the second display regions based on determined luminance.

The luminance compensation unit adjusts data voltages applied to at least one of the first display region and the second display regions so that the difference between the measured amounts of light in the first display region and the second display regions is minimized.

The luminance compensation unit adjusts data voltages applied to the second display regions so that the measured amount of light in the second display regions is identical to the measured amount of light in the first display region based on the measured amount of light in the to first display region.

The luminance compensation unit adjusts data voltages applied to at least one of the first display region and the second display region based on a difference between each of the measured amounts of light in the first display region and the second display regions and a reference amount of light.

A plurality of pixels are disposed the first display region and the second display regions, the plurality of pixels including an emission device and a driving thin film transistor that is connected to the emission device and supplies a driving current, and the luminance compensation unit compensates for luminance by adjusting a voltage applied to a driving gate electrode of the driving thin film transistor.

The driving thin film transistor includes a driving semiconductor layer; a driving gate electrode covering a channel region of the driving semiconductor layer, wherein a first insulating layer and a second insulating layer above the first insulating layer are disposed between the driving semiconductor layer and the driving gate electrode and the second insulating layer is disposed above a first electrode of a storage capacitor disposed on the first insulating layer, the driving gate electrode being connected to a first electrode of the storage capacitor via a contact hole; and a driving source electrode and a driving drain electrode corresponding to a driving source region and a driving drain region that are doped with impurities on the driving semiconductor layer.

The second display regions are bent toward a first side in which an image is displayed or a second side opposite to the first side in which an image is displayed.

At least one optical sensor is disposed in a non-display region of the flexible display panel according to each display region.

The optical sensor is disposed in a dummy pixel of the first display region and the second display regions.

According to another aspect of the present invention, there is provided a method of compensating for luminance of a flexible display device, the method including, on a flexible display panel including a first display region and second display regions in both sides of the first display region and having a shape of a curved surface that is bent from a center of the flexible display panel at an angle, measuring the amount of light in the first display region and the second display regions by using an optical sensor disposed in each of the first display region and the second display regions; and compensating for luminance of the first display region and luminance of the second display region based on the measured amounts of light.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 7 is a flowchart schematically illustrating a method of compensating for luminance of the display device of FIG. 1, according to an embodiment of the present invention.

DETAILED DESCRIPTION OF THE INVENTION

Figure 1:
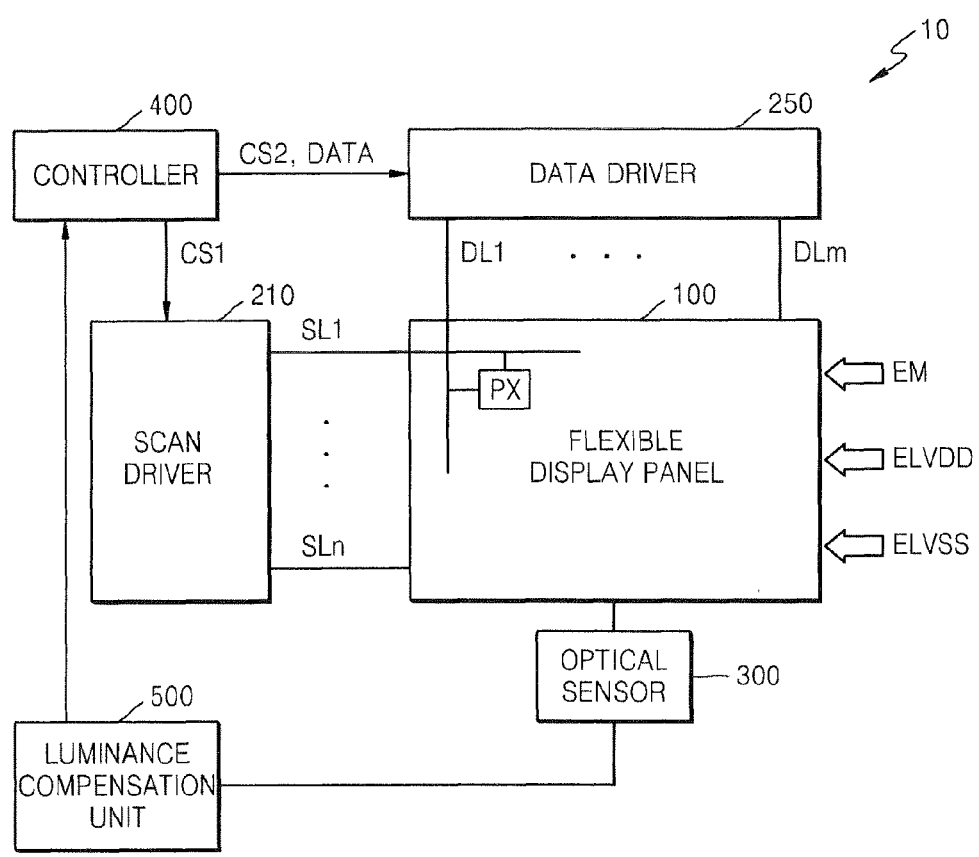
FIG. 1 is a block diagram showing a schematic structure of a display device including a flexible display panel according to an embodiment of the present invention.

Expressions such as "at least one of," when preceding a list of elements, modify the entire list of elements and do not modify the individual elements of the list.

The present invention will now be described more fully with reference to the accompanying drawings, in which exemplary embodiments of the invention are shown, so that one or ordinary skill in the art may easily implement the present invention. The invention may, however, be embodied in many different forms and should not be construed as being limited to the embodiments set forth herein.

Unrelated portions are omitted so as to clearly describe the present invention, and the same or similar elements throughout the specification refer to like reference numerals.

In addition, since the size and the thickness of each element in the drawings are arbitrarily marked for conveniences of explanation, the present invention is not limited thereto.

In the drawings, the thicknesses of several layers and regions are enlarged so as to clearly express the layers and regions. In the drawings, for conveniences of explanation, the thicknesses of partial layers and regions are exaggerated. When a portion, such as a layer, a film, a region, or a plate, is displaced "on" or "above" another portion, this involves the case where still another portion is interposed between the portion and another portion in addition to the case where the portion is disposed "directly on" another portion.

In addition, when a portion "comprises" an element throughout the specification, the portion may not exclude another element but may further comprise another element unless there is no particularly opposed description. Furthermore, "above~" throughout the specification means that a portion is located on or under of an object portion and does not necessarily mean that the portion is located on the object portion based on a direction of gravity.

Figure 2:
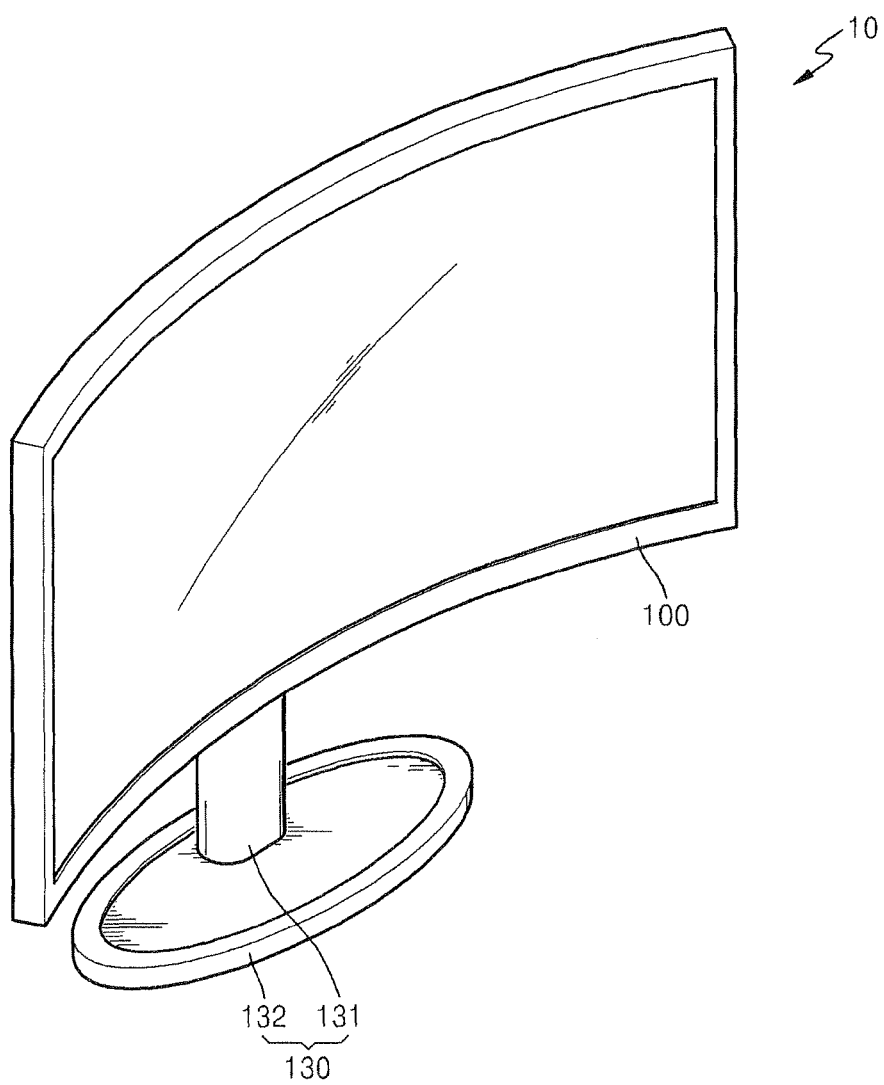
FIG. 2 is a perspective view of the display device including the flexible display panel illustrated in FIG. 1.
Figure 3A:
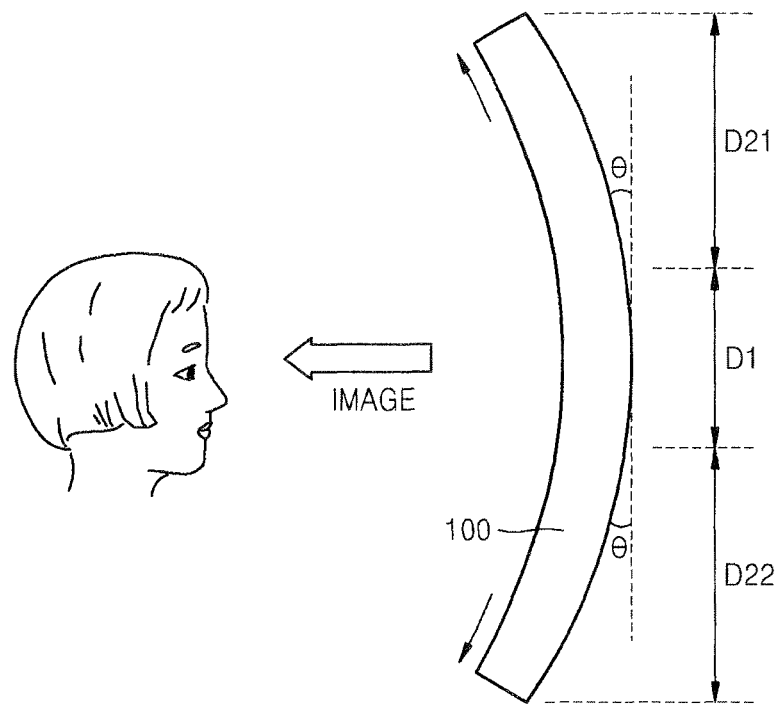
FIGS. 3A and 3B are views showing sides of a flexible display panel according to an embodiment of the present invention.
Figure 3B:
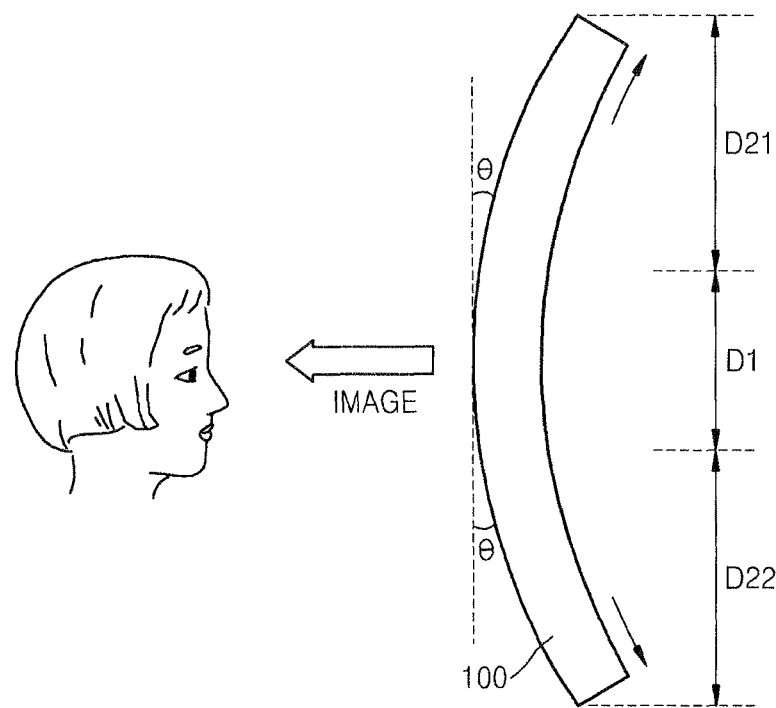

FIG. 1 is a block diagram showing a schematic structure of a display device including a flexible display panel according to an embodiment of the present invention, FIG. 2 is a perspective view of the display device including the flexible display panel illustrated in FIG. 1, and FIGS. 3A and 3B are views showing sides of a flexible display panel according to an embodiment of the present invention.

Referring to FIG. 1, the display device 10 includes a flexible display panel 100, a scan driver 210, a data driver 250, an optical sensor 300, a controller 400, and a luminance compensation unit 500.

Arranged in the form of a matrix on the flexible display panel 100 are, a plurality of scan lines SL1 to SLn spaced apart from one another by a predetermined distance and arranged in rows, and a plurality of data lines DL1 to DLm spaced apart from one another by a predetermined distance and arranged in columns. Pixels PX are arranged in the form of a matrix in regions where the plurality of scan lines SL1 to SLn and the plurality of data lines DL1 to DLm intersect one another. A direction of each row in which the pixels PX are arranged, i.e., a direction that follows the scan lines SL1 to SLn so as to select rows, is defined as a row direction, and a direction of each column in which the pixels PX are arranged, i.e., a direction that is perpendicular to the scan lines SL1 to SLn, is defined as a column direction.

The scan driver 210 may generate scan signals via the plurality of scan lines SL1 to SLn and may supply the scan signals sequentially to the flexible display panel 100.

The data driver 250 may supply the data signals sequentially to the flexible display panel 100 via the plurality of data lines DL1 to DLm. The data driver 250 converts input image data DATA having a gray scale that is input from the controller 400, into data signals (see Dm of FIG. 5) having current or voltage form.

Referring to FIG. 2, the flexible display panel 100 has a curved surface that is formed when the flexible display panel 100 having a rectangular shape with four corners is bent from its center in a vertical or horizontal direction. FIG. 2 shows an example of the flexible display panel 100 that is bent from its center in the horizontal direction, i.e., bent with respect to a vertical axis. FIGS. 3A and 3B show examples of the flexible display panel 100 that is bent from its center in the vertical direction, i.e., bent with respect to a horizontal axis.

The flexible display panel 100 may have a curved surface shape when it is bent toward a front side in which an image is displayed, as illustrated in FIG. 3A. Also, the flexible display panel 100 may have a curved surface shape when it is bent toward an opposite side to the front side in which the image is displayed, as illustrated in FIG. 3B.

The flexible display panel 100 includes a first display region D1 and second display regions D21 and D22 that are at both sides of the first display region D1. The second display regions D21 and D22 are at both sides of the first display region D1 in the vertical direction in FIGS. 3A and 3B, but may be at both sides of the first display region in the horizontal direction with respect to FIG. 2.

A degree of bending of the curved surface in the first display region D1 is relatively smaller than that in the second display regions D21 and D22. The first display region D1 is approximately flat from the center of the flexible display panel 100.

The second display regions D21 and D22 are bent at an angle θ with respect to the center axis of the flexible display panel 100, and a degree of bending of the curved surface in the second display regions D21 and D22 may be increased as the flexible display panel 100 gets closer to the corners. In this case, the degree of bending of the curved surface in the second display regions D21 and D22 in the vertical or horizontal direction is symmetrical. The degree of bending of the flexible display panel 100 may be fixed or may vary in response to an external control signal.

The sizes or areas of the first display region D1 and the second display regions D21 and D22 may vary according to the degree of bending of the flexible display panel 100.

As illustrated in FIG. 2, the flexible display panel 100 may be supported by a panel support member 130. The panel support member 130 may include a pillar portion 131 that is combined with the flexible display panel 100 and a base portion 132 that is combined with the pillar portion 131. In FIG. 2, the panel support member 130 is installed on the desk top (not shown); however, aspects of the present invention are not limited thereto. The panel support member 130 may be installed on a wall or ceiling plane.

A shade, perspective, and refraction at a primary viewing angle depending on the position of the flexible display panel 100 having the curved surface shape may vary according to the degree of bending of the flexible display panel 100. Thus, if, like in a general flat panel, the same optical characteristics are shown on the entire flexible display panel 100, picture quality characteristics, such as luminance, color sense, and the like, are non-uniform according to the position of the flexible display panel 100 when the picture quality characteristics are recognized by naked eyes. For example, luminance of the second display regions D21 and D22 may be lower or higher than that of the first display region D1 according to the degree of bending of the flexible display panel 100, and a luminance difference within the second display regions D21 and D22 may occur.

In the current embodiment of the present invention as shown in FIG. 1, the flexible display panel 100 includes the optical sensor 300, and the optical sensor 300 measures the amount of light irradiated in each display region of the flexible display panel 100 and varies the data signals (see Dm of FIG. 5) according to each display region based on the measured amount of light, thereby compensating for the luminance difference in each display region that occurs due to the bent of the flexible display panel 100.

At least one optical sensor 300 may be disposed in each of the first display region D1 and the second display regions D21 and D22 of the flexible display panel 100. The optical sensor 300 measures the amount of light (intensity of light or luminance) of the first display region D1 and the second display regions D21 and D22 of the flexible display panel 100. The optical sensor 300 may be a thin film transistor type optical sensor or a diode type optical sensor. The amount of light that is measured by the optical sensor 300 includes external illuminance and all the amount of light generated in the pixels PX of a display region around which the optical sensor 300 is disposed.

Referring again to FIG. 1, the controller 400 generates a scan control signal CS1 and a data control signal CS2 to transmit the scan control signal CS1 and the data control signal CS2 to the scan driver 210 and the data driver 250, respectively. Thus, the scan driver 210 applies the scan signals sequentially to the scan lines SL1 to SLn, and the data driver 250 applies the data signals (see Dm of FIG. 5) to the pixels PX via data lines DL1 to DLm. The controller 400 receives compensation values of the data signals (see Dm of FIG. 5) from the luminance compensation unit 500 and outputs the image data DATA, that is compensated for based on the compensation values, to the data driver 250. Also, a first power supply voltage ELVDD, a second power supply voltage ELVSS, an emission control signal EM, and an initialization signal (see Vint of FIG. 5) may be applied to each pixel PX by control of the controller 400.

The luminance compensation unit 500 receives the amount of light that is measured by the optical sensor 300 in each of the first display region D1 and the second display regions D21 and D22. The measured amount of light corresponds to a leakage current that occurs when a reverse bias voltage is applied to the optical sensor 300. The luminance compensation unit 500 compensates for luminance of the first display region D1 and luminance of the second display regions D21 and D22 based on the measured amounts of light.

There is a difference between the amount of light in the first display region D1 and the amount of light in the second display regions D21 and D22 that are measured by the optical sensor 300. The difference is caused by external illuminance and the bent angle of the flexible display panel 100. If external illuminance conditions are the same, it may be regarded that the difference in the amounts of light between the first display region D1 and the second display regions D21 and D22 is caused by the bent angle of the flexible display panel 100.

The luminance compensation unit 500 compensates for luminance of at least one of the first display region D1 and the second display regions D21 and D22 so that the difference in the amounts of light between the first display region D1 and the second display regions D21 and D22 may be eliminated or minimized. For example, the luminance compensation unit 500 may determine the measured amount of light in the first display region D1 as a predetermined reference amount of light and calculate compensation values for varying the data signals (see Dm of FIG. 5) to be applied to each pixel PX of the second display regions D21 and D22 so that the measured amount of light in the second display regions D21 and D22 may be identical to the measured amount of light in the first display region D1, thereby outputting the compensation values to the controller 400.

Alternatively, the luminance compensation unit 500 may compare the measured amount of light in the first display region D1 with the predetermined reference amount of light, may compare the measured amount of light in the second display regions D21 and D22 with the reference amount of light, and may calculate compensation values for varying the data signals (see Dm of FIG. 5) to be applied to each pixel PX of at least one of the first display region D1 and the second display regions D21 and D22 so that the measured amount of light in the first display region D1 and the measured amount of light in the second display regions D21 and D22 may be the same as the reference amount of light, thereby outputting the compensation values to the controller 400.

That is, in the current embodiment of the present invention, a luminance difference according to the position of the flexible display panel 100 that is caused by the bent angle of the flexible display panel 100 may be detected by the optical sensor 300, and the detected luminance difference may be compensated for by the optical sensor 300. Thus, recognition characteristics may be adjusted regardless of the position of the flexible display panel 100.

The display device 10, according to the present invention, may store a lookup table or graph, in which the relationship between the measured amount of light of the optical sensor 300 and luminance or the relationship between the measured amount of light of the optical sensor 300 and the compensation values of the data signals (see Dm of FIG. 5) is defined, in a memory (not shown) previously in consideration of the bent angle of the flexible display panel 100 and may calculate or select the compensation values of the data signals (see Dm of FIG. 5) for compensating for luminance by referring to the lookup table or graph, thereby outputting the calculated or selected compensation values to the controller 400. The measured amount of light may be calculated by using a leakage current of the optical sensor 300.

When a request for luminance compensation is present by a user input while an image is displayed on the flexible display panel 100, in the display device 10 according to the present invention, the amount of light in a current frame is measured by using the optical sensor 300, and luminance of each display region of the flexible display panel 100 is compensated for based on the measured amount of light.

Alternatively, in the display device 10 according to the present invention, the amount of light may be measured by using the optical sensor 300 at a predetermined frame interval while the image is displayed on the flexible display panel 100, and luminance of the display device 10 in each display region of the flexible display panel 100 may be compensated for based on the measured amount of light.

Figure 4:
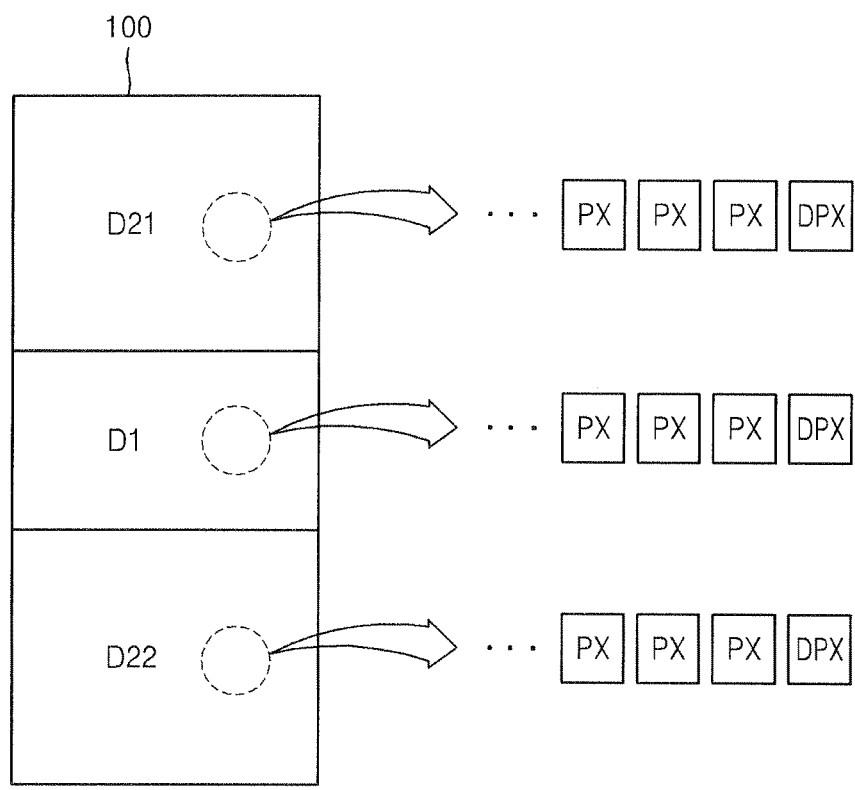
FIG. 4 shows an example in which an optical sensor is disposed on the flexible display panel illustrated in FIGS. 3A and 3B.

FIG. 4 shows an example in which an optical sensor is disposed on the flexible display panel illustrated in FIGS. 3A and 3B.

The optical sensor may be embedded in the flexible display panel 100, and at least one optical sensor may be disposed in each display region of the flexible display panel 100. At least one optical sensor may be disposed in a non-display region of the flexible display panel 100 according to each display region of the flexible display panel 100. The optical sensor may be disposed in a dummy pixel region that is in a row or column of each display region of the flexible display panel 100.

FIG. 4 shows an example in which the optical sensor is disposed in a dummy pixel DPX formed in the leftmost side of a row of the pixel PX in the first display region D1 and the second display regions D21 and D22 of the flexible display panel 100. The dummy pixel DPX may be formed in at least one of the rightmost and leftmost sides of the row. The optical sensor may be disposed in at least one dummy pixel DPX formed in one of the rightmost and leftmost sides of the row.

The embodiment of FIG. 4 is just an example, and aspects of the present invention are not limited thereto, and the optical sensor may be properly disposed in each display region. For example, one or more optical sensors may be disposed at right and left sides of each of the first display region D1 and the second display regions D21 and D22.

Figure 5:
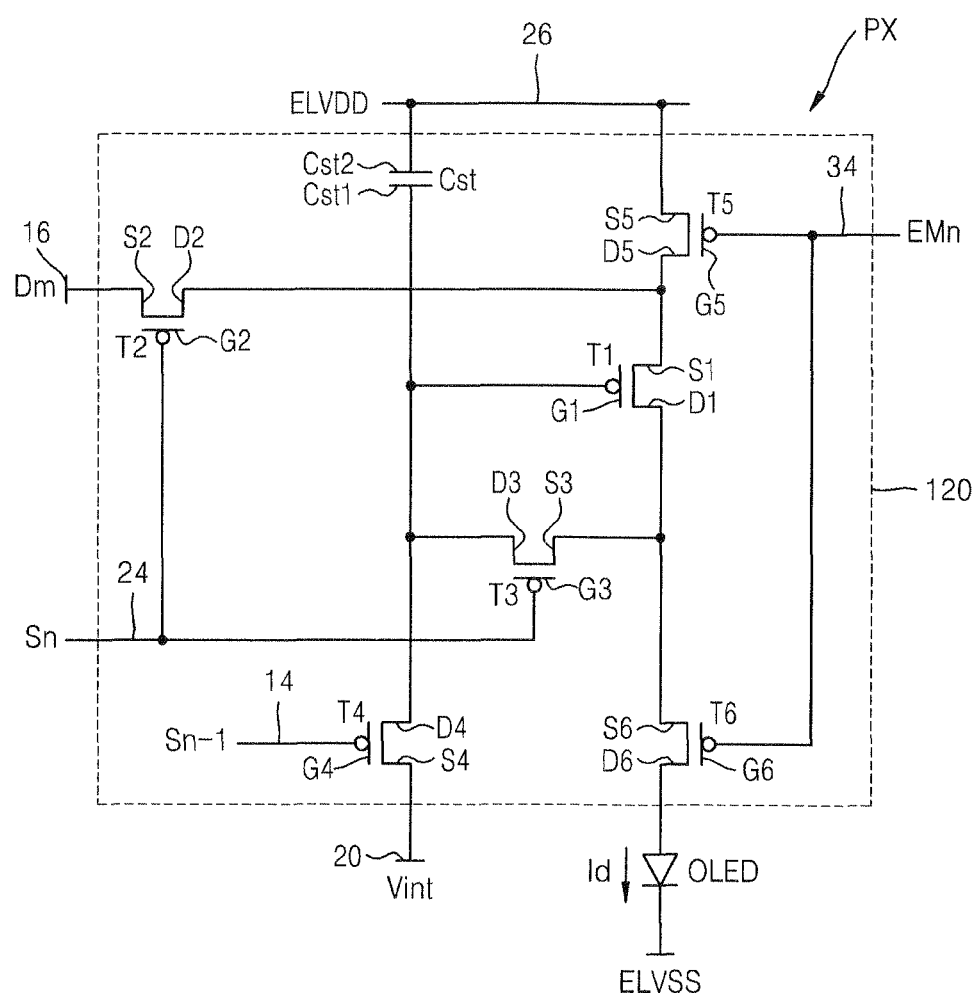
FIG. 5 is a circuit diagram of a pixel according to an embodiment of the present invention.
Figure 6:
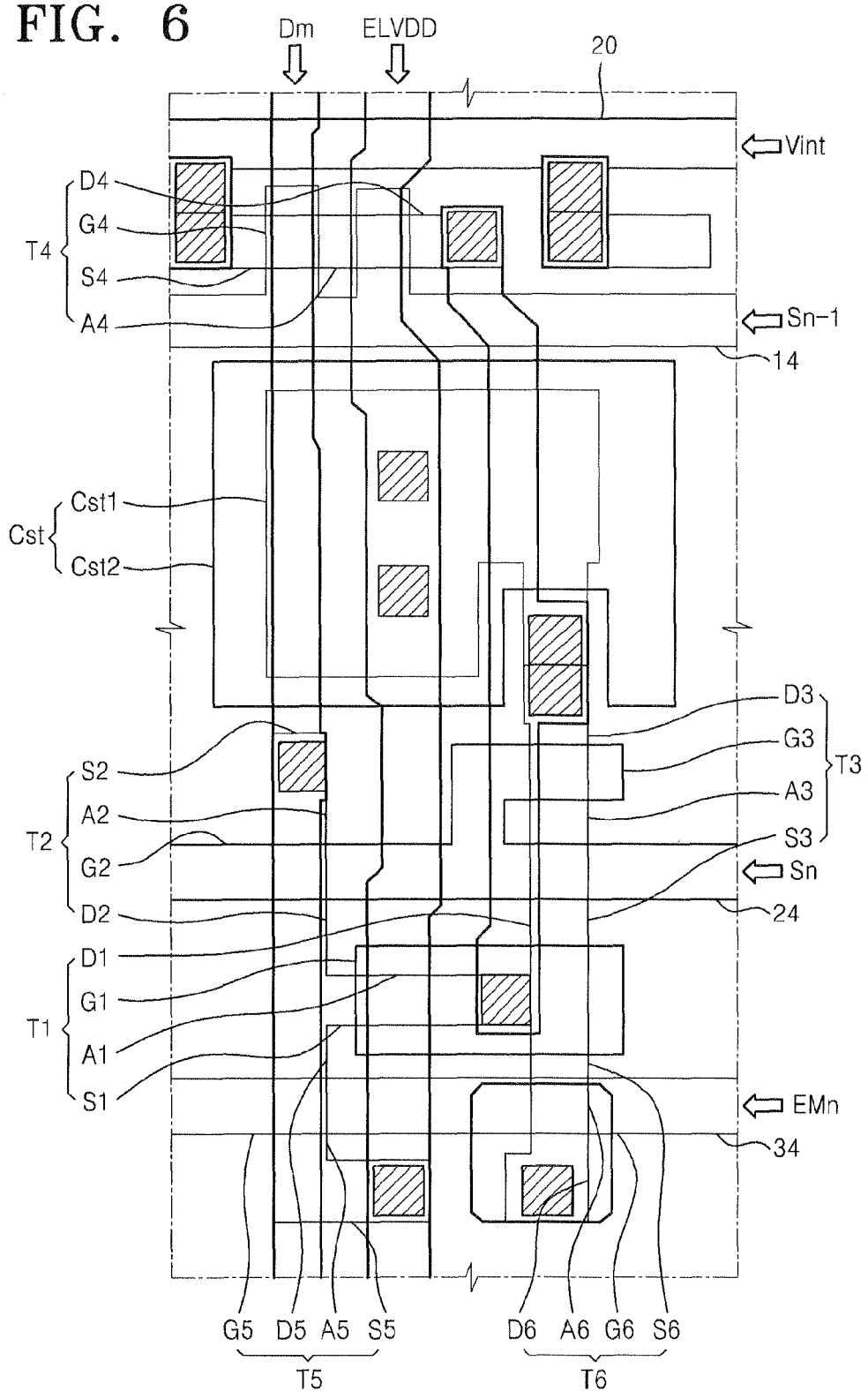
FIG. 6 is a cross-sectional view of the pixel illustrated in FIG. 5.

FIG. 5 is a circuit diagram of the pixel PX according to an embodiment of the present invention, and FIG. 6 is a cross-sectional view of the pixel PX illustrated in FIG. 5.

Referring to FIGS. 5 and 6, one pixel PX of the flexible display panel 100 according to the current embodiment of the present invention may include six thin film transistors and one capacitor.

The pixel PX includes a pixel circuit 120 including a plurality of thin film transistors (TFTs) T1 to T6 and a storage capacitor Cst. The pixel PX further includes an organic light emitting diode (OLED) that emits light by using a driving voltage transmitted from the pixel circuit 120.

Also, the pixel PX includes a scan line 24 in which a scan signal Sn is transmitted, a previous scan line 14 in which a previous scan signal Sn−1 is transmitted to an initialization thin film transistor T4, an emission control line 34 in which an emission control signal EMn is transmitted to an operation control thin film transistor T5 and an emission control thin film transistor T6, a data line 16 which intersects the scan line 24 and in which data signals Dm are transmitted, a driving voltage line 26 in which the first power supply voltage ELVDD is transmitted and which is nearly parallel to the data line 16, and an initialization voltage line 20 in which the initialization voltage Vint for initializing a driving thin film transistor T1 is transmitted.

The plurality of TFTs T1 to T6 include the driving thin film transistor T1, a switching thin film transistor T2, a compensation thin film transistor T3, the initialization thin film transistor T4, the operation control thin film transistor T5, and the emission control thin film transistor T6. Hereinafter, the case where a thin film transistor is a p-channel metal oxide semiconductor (PMOS) thin film transistor will be described.

The driving thin film transistor T1, the switching thin film transistor T2, the compensation thin film transistor T3, the initialization thin film transistor T4, the operation control thin film transistor T5, and the emission control thin film transistor T6 are formed along a semiconductor layer. The semiconductor layer is formed of polysilicon or oxide semiconductor and includes a channel region that is not doped with an impurity and source and drain regions that are doped with impurities at both sides of the channel region. Here, the impurity varies according to the type of a thin film transistor and may be an N-type impurity or a P-type impurity. The semiconductor layer includes a driving semiconductor layer A1 of the driving thin film transistor T1, a switching semiconductor layer A2 of the switching thin film transistor T2, a compensation semiconductor layer A3 of the compensation thin film transistor T3, an initialization semiconductor layer A4 of the initialization thin film transistor T4, an operation control semiconductor layer A5 of the operation control thin film transistor T5, and an emission control semiconductor layer A6 of the emission control thin film transistor T6.

The driving thin film transistor T1 includes the driving semiconductor layer A1, a driving gate electrode G1, a driving source electrode S1, and a driving drain electrode D1. The driving gate electrode G1 of the driving thin film transistor T1 is connected to a first electrode Cst1 of the storage capacitor Cst, the driving source electrode S1 is connected to the driving voltage line 26 via the operation control thin film transistor T5, and the driving drain electrode D1 is electrically connected to an anode of the organic light emitting diode (OLED) via the emission control thin film transistor T6.

The driving thin film transistor T1 supplies a driving current Id to the OLED by using the data signals Dm received by a switching operation of the switching thin film transistor T2. Although not shown, the driving gate electrode G1 of the driving thin film transistor T1 covers the channel region of the driving semiconductor layer A1, and a first insulating layer and a second insulating layer above the first insulating layer are disposed between the driving semiconductor layer A1 and the driving gate electrode G1. The driving gate electrode G1 is connected by a connection member to the first electrode Cst1 of the storage capacitor Cst via a contact hole. The first electrode Cst1 of the storage capacitor Cst is disposed on the first insulating layer. The driving source electrode S1 corresponds to a driving source region that is doped with an impurity on the driving semiconductor layer A1, and the driving drain electrode D1 corresponds to a driving drain region that is doped with an impurity on the driving semiconductor layer A1.

The switching thin film transistor T2 includes the switching semiconductor layer A2, a switching gate electrode G2, a switching source electrode S2, and a switching drain electrode D2. The switching gate electrode G2 of the switching thin film transistor T2 is connected to the scan line 24, the switching source electrode S2 is connected to the data line 16, and the switching drain electrode D2 is connected to the driving source electrode S1 of the driving thin film transistor T1 and is connected to the driving voltage line 26 via the operation control thin film transistor T5. The switching thin film transistor T2 is turned on in response to the scan signal Sn that is transmitted via the scan line 24 and performs a switching operation of transmitting the data signals Dm transmitted to the data line 16 to the driving source electrode S1 of the driving thin film transistor T1. The switching source electrode S2 corresponds to a switching source region that is doped with an impurity on the switching semiconductor layer A2, and the switching drain electrode D2 corresponds to a switching drain region that is doped with an impurity on the switching semiconductor layer A2.

The compensation thin film transistor T3 includes the compensation semiconductor layer A3, a compensation gate electrode G3, a compensation source electrode S3, and a compensation drain electrode D3. The compensation gate electrode G3 of the compensation thin film transistor T3 is connected to the scan line 24, the compensation source electrode S3 is connected to the driving drain electrode D1 of the driving thin film transistor T1 and is connected to an anode of the OLED via the emission control thin film transistor T6, and the compensation drain electrode D3 is commonly connected to the first electrode Cst1 of the storage capacitor Cst, the initialization drain electrode D4 of the initialization thin film transistor T4, and the driving gate electrode G1 of the driving thin film transistor T1. The compensation thin film transistor T3 is turned on in response to the scan signal Sn transmitted via the scan line 24 and connects the driving gate electrode G1 of the driving thin film transistor T1 and the driving drain electrode D1, thereby diode-connecting the driving thin film transistor T1. The compensation gate electrode G3 forms a dual gate electrode, thereby preventing a leakage current. The compensation source electrode S3 corresponds to a compensation source region that is doped with an impurity on the compensation semiconductor layer A3, and the compensation drain electrode D3 corresponds to a compensation drain region that is doped with an impurity on the compensation semiconductor layer A3.

The initialization thin film transistor T4 includes the initialization semiconductor layer A4, an initialization gate electrode G4, an initialization source electrode S4, and an initialization drain electrode D4. The initialization gate electrode G4 of the initialization thin film transistor T4 is connected to the previous scan line 14, the initialization source electrode S4 is connected to the initialization voltage line 20, and the initialization drain electrode D4 is commonly connected to the first electrode Cst1 of the storage capacitor Cst, the compensation drain electrode D3 of the compensation thin film transistor T3, and the driving gate electrode G1 of the driving thin film transistor T1. The initialization thin film transistor T4 is turned on in response to the previous scan signal Sn−1 transmitted via the previous scan line 14 and performs an initialization operation of initializing a voltage of the driving gate electrode G1 of the driving thin film transistor T1 by transmitting the initialization voltage Vint to the driving gate electrode G1 of the driving thin film transistor T1. The initialization gate electrode G4 may be formed as a dual gate electrode.

The operation control thin film transistor T5 includes the operation control semiconductor layer A5, an operation control gate electrode G5, an operation control source electrode S5, and an operation control drain electrode D5. The operation control gate electrode G5 of the operation control thin film transistor T5 is connected to the emission control line 34, the operation control source electrode S5 is connected to the driving voltage line 26, and the operation control drain electrode D5 is connected to the driving source electrode S1 of the driving thin film transistor T1 and the switching drain electrode D2 of the switching thin film transistor T2. The operation control source electrode S5 is an operation control source region that is doped with an impurity on the operation control semiconductor layer A5, and the operation control drain electrode D5 corresponds to an operation control drain region that is doped with an impurity on the operation control semiconductor layer A5.

The emission control thin film transistor T6 includes the emission control semiconductor layer A6, an emission control gate electrode G6, an emission control source electrode S6, and an emission control drain electrode D6. The emission control gate electrode G6 of the emission control thin film transistor T6 is connected to the emission control line 34, the emission control source electrode S6 is connected to the driving drain electrode D1 of the driving thin film transistor T1 and the compensation source electrode S3 of the compensation thin film transistor T3, and the emission control drain electrode D6 is electrically connected to an anode of the OLED. The operation control thin film transistor T5 and the emission control thin film transistor T6 are simultaneously turned on in response to the emission control signal EMn transmitted via the emission control line 34 so that the first power supply voltage ELVDD may be transmitted to the OLED and the driving current Id may flow through the OLED. The emission control source electrode S6 corresponds to an emission control source region that is doped with an impurity on the emission control semiconductor layer A6, and the emission control drain electrode D6 is connected by the connection member to the anode of the OLED.

The first electrode Cst1 of the storage capacitor Cst is commonly connected to the driving gate electrode G1 of the driving thin film transistor T1, the compensation drain electrode D3 of the compensation thin film transistor T3, and the initialization drain electrode D4 of the initialization thin film transistor T4 via a connection node. The first electrode Cst1 is formed as a floating electrode having an island shape and is formed on the same layer as the previous scan line 14, the emission control line 34, the initialization gate electrode G4, the operation control gate electrode G5, and the emission control gate electrode G6 by using the same material.

A second electrode Cst2 of the storage capacitor Cst is connected to the driving voltage line 26. The second electrode Cst2 is formed as a floating electrode having an island shape and overlaps with the entire first electrode Cst1. The second electrode Cst2 is formed on the same layer as the initialization voltage line 20, the scan line 24, the driving gate electrode G1, the switching gate electrode G2, and the compensation gate electrode G3 by using the same material.

An insulating layer (not shown) having a dual layer structure is formed between a semiconductor layer and a gate electrode of the driving thin film transistor T1, the switching thin film transistor T2, and the compensation thin film transistor T3 so that a thicker gate insulating layer than a gate insulating layer having a single layer structure of the initialization thin film transistor T4, the operation control thin film transistor T5, and the emission control thin film transistor T6 may be disposed.

A cathode of the OLED is connected to the second power supply voltage ELVSS. Thus, the OLED emits light by using the driving current Id transmitted from the driving thin film transistor T1, thereby displaying an image.

Hereinafter, a detailed operation of the pixel PX illustrated in FIG. 5 will be described.

First, the previous scan signal Sn−1 at a low level is supplied via the previous scan line 14 during an initialization period. Then, the initialization thin film transistor T4 is turned on in response to the previous scan signal Sn−1 at the low level, and the initialization voltage Vint is provided to the driving gate electrode G1 of the driving thin film transistor T1 from the initialization voltage line 20 via the initialization thin film transistor T4, and the driving thin film transistor T1 is initialized by the initialization voltage Vint.

Subsequently, the scan signal Sn at a low level is supplied via the scan line 24 during a data programming period. Then, the switching thin film transistor T2 and the compensation thin film transistor T3 are turned on in response to the scan signal Sn at the low level.

In this case, the driving thin film transistor T1 is diode-connected by the turned-on compensation thin film transistor T3 and is biased in a forward direction.

Then, a compensation voltage Dm+Vth (where Vth has a negative value), that is generated when the data signals Dm supplied from the data line 16 is reduced by a threshold voltage Vth of the driving thin film transistor T1, is applied to the driving gate electrode G1 of the driving thin film transistor T1.

The first power supply voltage ELVDD and the compensation voltage Dm+Vth are applied to both ends (that is, first and second electrodes Cst1 and Cst2) of the storage capacitor Cst, and charges corresponding to a difference between the first power supply voltage ELVDD and the compensation voltage Dm+Vth applied to both ends of the storage capacitor Cst are stored in the storage capacitor Cst. Next, the emission control signal EMn that is supplied from the emission control line 34 during an emission period is changed from a high level to a low level. Then, the operation control thin film transistor T5 and the emission control thin film transistor T6 are turned on in response to the emission control signal EMn at a low level during the emission period.

Then, the driving current Id is generated due to a difference between a voltage applied to the driving gate electrode G1 of the driving thin film transistor T1 and the first power supply voltage ELVDD, and the driving current Id is supplied to the OLED via the emission control thin film transistor T6. A gate-source voltage (Vgs) of the driving thin film transistor T1 is maintained as {(Dm+Vth)−ELVDD} by the storage capacitor Cst during the emission period. In relation to the current-voltage relationship of the driving thin film transistor T1, the driving current Id is in proportion to a square $(Dm-ELVDD)^2$ of a value obtained by subtracting the threshold voltage Vth from the gate-source voltage Vgs. That is, emission luminance of the OLED may be controlled according to the data signals Dm.

Thus, the display device 10 according to the present invention adjusts the data signals Dm according to the bent angle of the flexible display panel 100 so that picture quality characteristics of the flexible display panel 100 may be uniform.

FIG. 7 is a flowchart schematically illustrating a method of compensating for luminance of the display device 10 of FIG. 1, according to an embodiment of the present invention.

Referring to FIG. 7, the optical sensor 300 that is disposed in each of the first display region D1 and the second display regions D21 and D22 of the flexible display panel 100, measures (S71) the amount of light in the first display region D1 and the amount of light in the second display regions D21 and D22. The optical sensor 300 measures all the amount of external light and the amount of light emitted by an emission device. The amounts of light measured by the optical sensor 300 are in proportion to the leakage current of the optical sensor 300.

The luminance compensation unit 500 compensates for luminance of the first display region D1 and luminance of the second display regions D21 and D22 based on the measured amounts of light in each display region. In detail, the luminance compensation unit 500 determines (S73) whether there is a difference between the measured amounts of light in the first display region D1 and the second display regions D21 and D22. If it is determined that there is the difference between the measured amounts of light, the luminance compensation unit 500 compensates (S75) for luminance of each display region so as to minimize the difference between the measured amounts of light. Compensation of luminance in the first display region D1 and the second display regions D21 and D22 may be performed by adjusting a voltage level of the data signals Dm applied to each pixel PX in the first display region D1 and the second display regions D1 and D22. The luminance compensation unit 500 may adjust the data signals Dm applied to at least one of the first display region D1 and the second display regions D21 and D22 so as to minimize the difference between the measured amounts of light in the first display region D1 and the second display regions D21 and D22.

The luminance compensation unit 500 may adjust the data signals Dm applied to the second display regions D21 and D22 based on the measured amount of light in the first display region D1 so that the measured amount of light in the second display regions D21 and D22 may be identical to the measured amount of light in the first display region D1. For example, when the measured amount of light in the second display regions D21 and D22 is smaller than the measured amount of light in the first display region D1, luminance of the second display regions D21 and D22 is lower than luminance of the first display region D1. In this case, the level of data signals Dm applied to the pixel PX of the second display regions D21 and D22 is decreased to a predetermined level so that luminance of the second display regions D21 and D22 may be increased.

The luminance compensation unit 500 may adjust the data signals Dm applied to at least one of the first display region D1 and the second display regions D21 and D22 based on the difference between each of the measured amounts of light in the first display region D1 and the second display regions D21 and D22 and a reference amount of light. For example, when the measured amount of light in the second display regions D21 and D22 is lower than the reference amount light and the measured amount of light in the first display region D1 is larger than the reference amount of light, luminance of the second display regions D21 and D22 is lower than luminance of the first display region D1. In this case, the voltage level of the data signals Dm applied to the pixel PX of the first display region D1 is increased to a predetermined level so that luminance of the first display region D1 may be decreased, and the voltage level of the data signals Dm applied to the pixel PX of the second display regions D21 and D22 is decreased to a predetermined level so that luminance of the second display regions D21 and D22 may be increased.

In an environment where external illuminances of the first display region D1 and the second display regions D21 and D22 are the same, the difference between the measured amounts of light in the first display region D1 and the second display regions D21 and D22 is caused by the bent angle of the flexible display panel 100. Thus, data signals Dm in the first display region D1 and the second display regions D21 and D22 are compensated for so that a difference in luminance according to the position of the flexible display panel 100 due to bending may be reduced.

In the embodiment of the present invention, a display device including pixels configured of PMOS thin film transistors has been described. However, aspects of the present invention are not limited thereto, and the present invention may be applied to a display device including pixels configured of n-channel MOS (NMOS) thin film transistors. In this case, data signals applied to each pixel are increased by a predetermined level so that luminance of the display device may be increased.

In the above-described embodiment, for conveniences of explanation, luminance in the entire first display region or the entire second display regions has been compensated for. However, aspects of the present invention are not limited thereto, and the first display region and the second display regions may be divided into a plurality of regions according to the design of the flexible display panel, and the amount of light in each of the plurality of regions may be measured using at least one optical sensor disposed in each of the regions, and the data signals may be adjusted according to each of the regions based on the measured amount of light so that luminance of the entire flexible display panel may be uniform.

Also, in the embodiment of the present invention, the driving thin film transistor of the pixel illustrated in FIG. 5 has been described. However, aspects of the present invention are not limited thereto, and the present invention may be applied to a pixel including a driving thin film transistor that is connected to an emission device and supplies a driving current and may be applied to a flexible display panel including the pixel.

As described above, in a flexible display device and a method of compensating for luminance of the flexible display device according to the present invention, non-uniformity of picture quality characteristics according to each region due to a bent of the flexible display panel may be eliminated by using an optical sensor disposed in each region of a flexible display panel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flexible display device comprising:
a flexible display panel comprising a first display region and second display regions disposed on opposite sides of the first display region, the flexible display panel having a shape of a curved surface when it is bent with respect to a central axis of the flexible display panel at an angle;
optical sensors disposed in each of the first display region and the second display regions and measuring amounts of light in the first display region and the second display regions; and
a luminance compensation unit compensating luminance of the first display region and luminance of the second display regions based on the measured amounts of light.

2. The flexible display device of claim 1, wherein the optical sensors measure external illuminance and the amount of light emitted from a pixel disposed in the first display region or the second display regions.

3. The flexible display device of claim 1, wherein the luminance compensation unit compensates for luminance of the first display region and luminance of the second display region based on a difference between the measured amounts of light in the first display region and the second display regions that occurs due to a bent angle of the flexible display panel.

4. The flexible display device of claim 3, further comprising a lookup table in which a relationship between the measured amounts of light of the optical sensors and luminance is defined, wherein the luminance compensation unit determines luminance corresponding to the difference between the measured amounts of light by using the lookup table and adjusts luminance of at least one of the first display region and the second display regions based on determined luminance.

5. The flexible display device of claim 1, wherein the luminance compensation unit adjusts data voltages applied to at least one of the first display region and the second display regions so that the difference between the measured amounts of light in the first display region and the second display regions is minimized.

6. The flexible display device of claim 1, wherein the luminance compensation unit adjusts data voltages applied to the second display regions so that the measured amount of light in the second display regions is identical to the measured amount of light in the first display region based on the measured amount of light in the first display region.

7. The flexible display device of claim 1, wherein the luminance compensation unit adjusts data voltages applied to at least one of the first display region and the second display region based on a difference between each of the measured amounts of light in the first display region and the second display regions and a reference amount of light.

8. The flexible display device of claim 1, wherein a plurality of pixels are disposed the first display region and the second display regions, the plurality of pixels comprising an emission device and a driving thin film transistor that is connected to the emission device and supplies a driving current, and the luminance compensation unit compensates for luminance by adjusting a voltage applied to a driving gate electrode of the driving thin film transistor.

9. The flexible display device of claim 8, wherein the driving thin film transistor comprises:
a driving semiconductor layer;
a driving gate electrode covering a channel region of the driving semiconductor layer, wherein a first insulating layer and a second insulating layer above the first insulating layer are disposed between the driving semiconductor layer and the driving gate electrode and the second insulating layer is disposed above a first electrode of a storage capacitor disposed on the first insulating layer, the driving gate electrode being connected to a first electrode of the storage capacitor via a contact hole; and
a driving source electrode and a driving drain electrode corresponding to a driving source region and a driving drain region that are doped with impurities on the driving semiconductor layer.

10. The flexible display device of claim 1, wherein the second display regions are bent toward a display side in which an image is displayed.

11. The flexible display device of claim 1, wherein the second display regions are bent toward a side opposite to a display side in which an image is displayed.

12. The flexible display device of claim 1, wherein at least one optical sensor is disposed in a non-display region of the flexible display panel according to each display region.

13. The flexible display device of claim 1, wherein the optical sensors are disposed in a dummy pixel of the first display region and the second display regions.

14. A method of compensating for luminance of a flexible display device, the method comprising:
on a flexible display panel comprising a first display region and second display regions disposed at opposite sides of the first display region and having a shape of a curved surface that is bent from a central axis of the flexible display panel at an angle, measuring the amount of light in the first display region and the second display regions by utilizing optical sensors disposed in each of the first display region and the second display regions; and
compensating for luminance of the first display region and luminance of the second display region based on the measured amounts of light.

15. The method of claim 14, wherein the optical sensors measure external illuminance and the amount of light emitted from a pixel disposed in the first display region or the second display regions.

16. The method of claim 14, wherein the compensating for luminance comprises compensating for luminance of the first display region and luminance of the second display region based on a difference between the measured amounts of light in the first display region and the second display regions that occurs due to a bent angle of the flexible display panel.

17. The method of claim 14, wherein the compensating for luminance comprises adjusting data voltages applied to at least one of the first display region and the second display regions so that the difference between the measured amounts of light in the first display region and the second display regions is minimized.

18. The method of claim 14, wherein the compensating for luminance comprises adjusting data voltages applied to the second display regions so that the measured amount of light in the second display regions is identical to the measured amount of light in the first display region based on the measured amount of light in the first display region.

19. The method of claim 14, wherein the compensating for luminance comprises adjusting data voltages applied to at least one of the first display region and the second display region based on a difference between each of the measured amounts of light in the first display region and the second display regions and a reference amount of light.

20. The method of claim 14, wherein the compensating for luminance comprises determining luminance corresponding to the difference between the measured amounts of light by using a lookup table in which a relationship between the measured amounts of light of the optical sensor and luminance is defined, and adjusting luminance of at least one of the first display region and the second display regions based on determined luminance.

\* \* \* \* \*